2,768,076

METHOD OF MAKING BIMETALLIC RELIEF-PRINTING PLATES

William F. Alexander, Cleveland, Ohio, assignor to Claber Bi-Metal Plate Company, Inc., New York, N. Y., a corporation of New York No Drawing. Application September 14, 1954, Serial No. 456,053

7 Claims. (Cl. 95—5.7)

This invention relates to the art of relief printing and more particularly to the making of resist-imaged chemically etched printing plates, and especially to the making of photoengravings.

Such plates are used in letterpress, newspaper and dry offset printing and whether so used, or used to make duplicates such as electrotypes or stereotype matrices, are called printing plates and are so alluded to herein.

The making of such printing plates, according to methods heretofore employed, has required a great deal of skill and know-how on the part of the engraver, in addition to considerable physical effort and the expenditure of much time in the production of a single printing plate. These problems are greatly aggravated by the fact that a single printing plate may contain closely spaced dots as in half-tone work, closely spaced lines as in Ben Day work, small type characters, widely spaced lines as in drawings or sketches and large blank spaces and spaces in between both extremes. These matters are of such consequence that the tendency has been away from letterpress printing, i. e. printing from raised type or other raised printing surfaces, to planographic printing for which the plates may be photographically or otherwise imaged but require no removal of the plate material over the background areas such as is necessary in producing a raised type or relief-printing plate.

An object of this invention is to provide methods and means for producing chemically etched relief-printing plates more efficiently and economically than was heretofore possible, the present application being directed to the new and improved methods for accomplishing the desired result.

It has been proposed that printing plates for relief printing be made of various metals such as copper, magnesium, zinc, etc., but it has been generally acknowledged by those siklled in the art that, notwithstanding that it is softer than plates of other metals, a zinc plate is preferable because of its relatively low cost, its resistance to corrosion and oxidization when exposed to the atmosphere and its ready acceptance and retention of the photographic resist-image material which may be applied as cold-top without the necessity of expending the extra time required for baking and its possible deleterious effect on the metal of the plate as in the hot-top method. After the availability of magnesium sheets at a cost not prohibitive, the use of magnesium printing plates was proposed. However, it was found that the magnesium printing plate, because of the solvent nature of etchant heretofore believed necessary to etch such plates, could not be imaged with the more easily applied and economical cold-top resist material, but required the use of hot-top imaging material which had to be baked on.

The working face of a magnesium printing plate must be cleaned with care immediately before each application of the resist material, a time consuming operation. Other objections to the use of magnesium printing plates are the difficulties involved in applying the resist-image on its surface. Chemicals in water, especially chlorides in city water, adversely affect the application of the resist-image to the magnesium surface and special treatment and considerable equipment changes must be made in developing techniques to overcome these inherent disadvantages in the use of printing plates having a magnesium working surface.

Nevertheless the magnesium printing plate has the advantage over zinc of having inherent hardness and light weight which permits higher speeds of the printing cylinders of the press and thus more economical and faster production. Moreover, it has been found that a magnesium printing plate work-hardens under pressure in use, and consequently does not collapse or show wear of the original dot or line structure of the original engraved image. These are important factors in most work requiring a large number of impressions from an original plate, especially in newspaper work. Besides, a magnesium printing plate withstands the attrition and crushing effect when used in making stereotype matrices, another important advantage.

As a first step in my improved method of making printing plates, I have provided a plate having all the advantageous features of both the zinc plate and the magnesium plate without the disadvantages of either. I have accomplished this, as disclosed in my copending application Serial No. 261,360, filed December 12, 1951, now U. S. Patent No. 2,704,512, by the use of a magnesium sheet as the base and major portion of the printing plate and on the face of such a sheet I have provided a coating of zinc to form the working surface of the printing plate to receive the resist-image material. The coating of zinc, as pointed out in my said patent may be from about .003″ to about .0003″ thick. However, I have discovered, for best results that the coating should be extremely thin, preferably in the order of from .0001 to .0005 inch thick, although coatings of zinc in the order of .005″ thick may be used, but not with the same efficacy.

While my zinc-coated magnesium plate is advantageous as a printing element or structure and as a resist-image and ink receptor, it also is advantageous in the process of etching the printing plate.

In etching resist-imaged printing plates it has been the practice of engravers to perform a series of successive steps involving in their execution a high degree of skill and judgment acquired over many years of experience. As a first step, after the resist-image had been applied to the plate and the background or non-image areas cleared of unhardened resist emulsion, the engraver scummed the plate. This was accomplished by brushing or washing the working surface of the plate with an etchant, usually nitric acid, to bring out in slight relief the lines and points of the image, care being taken not to prolong the operation to the degree where the image would be undercut by lateral action of the etchant. The plate was then washed and dried and a resinous powder, such as dragon's-blood, was brushed over the plate by lateral strokes in four directions to cause the resist to accumulate against the side edges of the lines and points formed by the scumming operation, the plate being heated and cooled after brushing in each of the four directions to melt and solidify the resist. This operation requires a high degree of skill and care since the resist must be banked in proper quantity adjacent the side-edge and yet not be permitted to accumulate on the non-image areas where it would prevent etching and removal of the background material.

After the resist is solidified, the plate is then usually placed in an etching machine where it is splashed with etchant, the corrosive action of which eats away the metal not covered with the image and side-edge resist. When the engraver considers that the etching process has continued to a point where undercutting of the image might begin, the etching process is interrupted by removing the plate from the etching machine and washing and drying the plate. Resist powder is again applied as before to the newly exposed edges formed by the etchant. Then the plate is returned to the etching machine and another bite is taken. The number of bites which are taken and resist-applying operations performed depends on the character of the work, half-tone work with closely spaced points requiring substantially less printing depth adjacent the points than that required for widely spaced lines as will be understood by those skilled in the art. The successive etching operations form shoulders or steps on the side walls of the lines and points and these shoulders have to be removed or treated in a separate operation.

With the zinc-coated magnesium plate of my invention, the resist-imaged plate is scummed to remove the superficial coating of zinc over the non-image areas and expose the underlying magnesium base plate. It may then be etched with the series of successive steps of etching and applying resist in the same manner as stated above.

However, I have discovered that the zinc coated magnesium plate after being scummed may be etched to printing depths in one operation, without the necessity of interrupting the etching operation to manually apply resist to the side edges of the points and lines, by the use of an etchant having the property of leaving a residue of the products of reaction as a resist at the interface of the zinc and magnesium and along the side edges of the points and lines, and propelling such an etchant upwardly against the face of the plate more or less perpendicularly thereto in the form of one or more streams. When so applied to the face-down printing plate the products of reaction resulting from the etching, I have found, lodge against the sloping sides of the points and lines but are dislodged from the flat areas between the points and lines. With the disappearance of the "flats" between the points, the resulting pits become covered with resist, being insoluble in the etchant, which thus terminates the etching operation on such portions while the etchant continues to have effect on the flat surfaces between the sloping edges of the lines. As a result of these discoveries, it is now possible to etch to printing depths in one bite or operation, after the scumming operation, magnesium based printing plates containing both half-tone and line images, a result not heretofore possible under comparable fast etch methods.

After the etching operation has continued for sufficient time to provide the proper printing depth between the lines and/or points, the etched plate is taken from the etching machine and the resist deposited as a result of the etching operation is removed. With the use of the etchant described below this is accomplished by washing the plate in a ten to twenty percent solution of ammonium dichromate which crystallizes and makes the resist brittle so that it can be readily brushed away from the side walls of the points and lines. The resist material may also be removed by applying to the face of the plate a dilute solution of nitric acid, then heating the plate, and brushing the resist from the plate with a stiff brush.

Since the etching operation and deposit of resist as a reaction of the etching operation is continuous, the side walls of the lines and points slope inwardly and away from the printing surface in a smooth curve, there being no shoulders or steps requiring removal or special treatment as in prior methods of etching.

By avoiding the use of resist powders, such as dragon's-blood, which are unavoidably airborne when being brushed on the plate, the health hazard resulting from inhalation of such powders by the engraver and others in the vicinity is eliminated. In the broader aspects of this invention any etchant solution having the characteristics of forming by the products of reaction a resist on the side walls of the points and lines may be used.

One such etchant which I have found to give satisfactory results is an aqueous solution containing ammonium persulfate along with either aluminum nitrate or aluminum sulfate and ammonium hydroxide.

The efficiency of this etch is the result of the rapid oxidizing effect of the ammonium persulfate on the magnesium base plate, and the reaction which causes a precipitate insoluble in the etchant to form on the side walls of the points and lines. This precipitate is the reaction product alumina gel, i. e. aluminum hydroxide, which is formed from the aluminum ions released from the aluminum nitrate or aluminum sulfate during the course of the reaction and the ammonium ions released from the ammonium persulfate as it oxidizes the magnesium. This gel has a tendency to cling to the surface of the magnesium.

The following is a formula which has been found satisfactory:

Aluminum nitrate (nonahydrate), 49–57 grams
Ammonium persulfate, 183–191 grams
Water to dissolve the above, 750 milliliters
Ammonium hydroxide concentrate dissolved in water, 14 milliliters
Water to make 1 liter Aluminum sulfate—45 to 53 grams—may be substituted for the aluminum nitrate in the above formula.

The above formula is multiplied a sufficient number of times to produce the quantity of etchant to be placed in the etching machine, eight to ten times the above quantity being sufficient to etch one magnesium printing plate 18" x 24" to printing depth, depending upon the area of the non-image portions to be etched. The pH of the etchant solution is preferably maintained for the purposes of the process from pH 2.5 to pH 4.3. Below pH 2.5 the extreme acidity of the solution interferes with the formation of the aluminum hydroxide precipitate; above pH 4.3 the etching speed is too slow for efficient operation. The etching ratio, i. e. the quantity of magnesium decomposed in a unit of time, is quite proportional to the temperature at which the etchant is maintained in the etching machine within a temperature range of 70° F. to 240° F. Below 70° F. the speed of the etch is too slow to be efficient. Above 240° F. the persulfate decomposes to a sulfate and slows the etching rate. A printing plate measuring 18"x 24" having an average amount of non-imaged area may be etched to printing depths according to the present invention in about fifteen minutes when the etchant is propelled vertically against the plate at a rate of about three gallons per minute and the temperature is maintained between 80° and 95° F. The maintenance of desired temperature is obtained by providing automatically controlled means for either heating or cooling the etchant in the etching machine to hold the temperature of the etchant to a predetermined value range.

The above etchant, it has been found, does not attack the side walls of the superficial zinc coating formed after the scumming operation to remove the zinc coating from the non-image areas, nor does it penetrate the interface between the zinc coating and the magnesium base plate. As soon as the etching operation begins in the etching machine, the alumina gel is deposited on the side walls of the zinc coating and on the side walls of the magnesium base plate as these side walls are formed.

As stated above, according to the present invention, the etchant is propelled upwardly more or less perpendicularly to and against the horizontally mounted printing plate in the etching machine. For this purpose, the etching machine is provided with one or more spray nozzles (which may be of the aspirating type) through which the etchant is forced by a centrifugal pump with sufficient pressure in the order of 40 p. s. i. at 72° F. to produce fine streams having enough impact force when striking the flat unimaged surfaces of the printing plate to dislodge therefrom any resist formed as a reaction product of the etching operation, such dislodged precipitant falling away from the plate back into the etching machine tub. However, the products of reaction clinging to the side walls are not dislodged, but remain as a resist against the action of the etchant.

The stream-producing nozzle means and pump and other metal parts of the etching machine coming in contact with the etchant, including the tub, may be made of a metal, such as stainless steel, which is not attacked by the etchant.

Heretofore it has been the practice to supply the etching machine with a large quantity of etchant so that a plurality of plates could be etched without removing and replacing the bath, and in order to provide a sufficient pool of etchant so that portions thereof could be thrown against the printing plate by one or more paddles interposed between the pool and the plate. With such etching machines the strength or effectiveness of the etchant gradually deteriorated due to the accumulation in the etchant solution of the metal or salts thereof removed from previously etched plates and the loss of potency of the acid. As a result the engraver had, at least during the etching of plates after the first one, to interrupt the etching process and inspect the printing plate from time to time to determine the depth to which the etch had been carried. Sometimes the inspection could be made at the same time that a plate was removed to receive applied resist but when the etching operation reached a critical depth, the etching process had frequently to be interrupted merely to inspect the plate. It will be seen, therefore, that a great deal of skill, based on long experience, was heretofore required to properly etch a printing plate.

These problems are obviated by the present invention by a practice quite contrary to that normally followed, by providing the etching machine with only a sufficient quantity of etchant to etch one plate, removing the batch after one plate has been etched and replacing it with a fresh batch of etchant to etch out the next plate. This would seem to be an extravagant and uneconomical procedure, but I have found that while, as heretofore practiced, a pool of etchant in the order of 25 gallons was used to etch about five or six plates 18" x 24", between one and two gallons only of the above etchant are needed to etch one such plate. Thus, according to my invention, there is a saving of over fifty percent in the quantity of etchant used. In addition to the economic advantage obtained by the use of single-plate-batches of etchant, there is the advantage that the etchant will be at the same strength for the beginning of the etching of each successive plate, depletion of the strength of the etchant throughout the progress of the etching operation depending upon the amount of non-image material to be removed from each particular plate to arrive at printing depth. Thus, the length of time that the etching operation should continue can be predetermined, the only consideration necessary being estimating the ratio of the area of the lines and points to the area of the non-imaged background portions, an ability already possessed by the skilled engraver.

With the availability of magnesium in sheet form, its use as a printing plate was proposed, as above stated, and methods were evolved for etching such plates. The etchant heretofore provided for etching magnesium plates included an organic solvent, diethylbenzene, a wetting agent and nitric acid. The diethylbenzene being a solvent for the cold-top resist-image emulsion, it was necessary to employ, in imaging a magnesium plate, so-called hot-top materials or enamels which are more costly than the cold-top material and require special treatment. In the imaging of a magnesium printing plate with hot-top material the plate is first cleaned of oxide, then the photographically hardened hot-top image-resist material is applied as a coating emulsion. The plate is then exposed to the proper light through a negative and then is developed to remove the unexposed resist material, after which the image-resist is baked onto the plate. The plate is then placed in an etching machine which has previously been provided with a pool of etchant. The etchant is splashed upwardly against the plate and attacks the exposed portions of the plate forming the background area. At the same time a resist is formed on the side walls of the lines and points as a result of the presence of the diethylbenzine and wetting agent.

However, this operation may be continued only to the point where the depth of the etch is in the order of .022 inch, which would be sufficient for work having half-tone screens and closely spaced, very fine type. If the work, that is to say, the imaged printing plate, contains lines or large type images, or large open areas, it would be necessary to remove the plate from the etching machine and completely clean it and manually apply resist to the partially etched plate before returning it to the etching machine for further etching operations. It would also be necessary to use a new bath of etchant.

As a result it is, as a practical matter, unfeasible to etch by the method just above described a magnesium printing plate containing images in half-tone point and line form in combination. This situation has been met in part by chemically etching in one or more operations to the greatest possible depth (when the chemically applied resist makes the etching operation ineffective) and then finally routing out the background areas mechanically.

While the method of the present invention embraces, in one form, as a first step the provision of a zinc-coated magnesium plate, the etching steps of the process are efficient and advantageous for some kinds of work in etching a magnesium printing plate without a surface coating of zinc or other metal, for with the one-operation etchant, for instance that described above, propelled against the magnesium plate from a one-batch loading of etchant, the plate having images in point and/or line form may be etched in the one operation. In practicing my method, it is not necessary to provide the magnesium with hot-top resist-image material since the etchant above described does not attack cold-top material, but it is, of course, necessary to clean the working surface of the magnesium plate immediately before applying any top material.

Likewise, by employing the etching steps of my method, printing plates of other metals having images in point and/or line form may be etched to printing depths in one operation without the necessity of interrupting the operation to manually apply resist. The etchant will, of course, be modified according to the metal to be etched.

While the etchant above described has been found to be efficient and advantageous, it should be understood that in the broader aspects of my invention my improved method of making resist-imaged chemically etched printing plates any etchant having the property of forming resist on the side walls of the points and lines as a reaction product may be employed. No claim is made herein to the etchant per se.

As stated above an object of the invention is to provide for the production of relief-printing plates, particularly photoengraved plates, more economically than was heretofore possible. The economy effected by the present invention is not only in labor but in elapsed time, for it is important in many printing jobs, especially newspaper work, to meet deadlines for publications.

Heretofore it was not practical, due to the slowness of the etching process and the cost of producing original etched plates, to use the latter where the same job or work is to be run on several presses, and the practice was to duplicate the original engraved relief plate by stereotype or other methods.

As is well known, some detail and sharpness of the image is unavoidably lost in making duplicates and the quality of the printed work accordingly suffers. Besides, if a duplicate is to be made from an original plate, that fact must be taken into consideration in making the original image and resist-image as regards the fineness of the screens and the closeness of the lines which may be successfully used.

With the use of the methods of the present invention, original, i. e. etched, plates may be made comparable in cost to duplicate plates and finer half-tone screens and truer fidelity of the printing surfaces on the plate and the impressions taken therefrom may be obtained than could possibly be obtained by the use of duplicate plates. Besides, the disadvantages arising from "mat" shrinkage and distortion from the original in making duplicates are completely avoided, this being important especially in obtaining exact registration in multicolor printing.

The method of making relief-printing plates for use on printing cylinders has heretofore been to image and etch the plate in flat form and then bend the plate to fit the curvature of the press cylinder on which it is to be used. That is to say, the plate may be bent to make it cylindrical or semi-cylindrical. Distortion of the image by the bending of the plate is unavoidable and variable, since the extent and manner in which the image is distorted depends upon the varying thickness of each plate at different portions thereof, which variation occurs because of differences in thickness between the printing face areas and etched-away background areas of the plate.

It has been impractical heretofore to bend the plate to give it the proper curvature after it has received its resist-image and before it is etched, because of the difficulties and time which would be required to manually apply resist several times until the plate is etched to printing depth, the difficulties being greatly aggravated by the fact that the plate would be curved.

Since, according to my invention, the etching operation, once it is started, need not be interrupted to manually apply resist, an original relief-printing plate having a resist-image thereon may be produced by bending the plate to the desired form and then proceeding to etch the plate in accordance with the method above described. Since the plate is of uniform thickness at the time it is bent, according to the present invention, having only the resist-image on its surface, it can be bent into perfect arc to produce the cylindrical or semicylindrical form desired, and no distortion of the printing image will be present.

Variations and modifications may be made within the scope of the claims and portions of the improvements may be used without others.

I claim:

1. The method of making a relief-printing printing plate of the type comprising a magnesium metal base plate having a thin zinc skin on its working face and in which the imaged printing surfaces are in relief with respect to non-printing areas, said method comprising the steps of forming a resist image on the surface of the zinc skin; removing portions of the zinc skin free from resist to uncover the underlying magnesium on those portions of the plate that are to comprise the non-printing areas; then supporting the imaged plate in a substantially horizontal plane with the imaged surface of the plate facing downwardly; propelling an etchant upwardly through spray-nozzle means in high pressure, fine continuous liquid streams against the downwardly facing plate and substantially covering the working face of the same, said etchant comprising a soluble aluminum salt and an oxidizing agent having the property of etching the exposed magnesium base metal and reacting with the latter in the formation of a precipitate insoluble in the etchant which precipitate is deposited on the surface of the plate, said streams having sufficient impact against the face of the plate to prevent accumulation of precipitate on the unimaged flat surfaces of the plate while leaving the precipitate as a resist on the etch-produced side walls delineating the non-printing areas adjacent the imaged printing surfaces; continuing said etchant propelling operation, without interruption to manually apply resist, for sufficient time to etch the plate to printing depth; and finally cleaning the plate of resist remaining thereon.

2. The method of making a relief-printing printing plate of the type comprising a magnesium metal base plate having a thin zinc skin on its working face and in which the imaged printing surfaces comprising line work and half-tone work are in relief to different printing depths, said method comprising the steps of forming a resist image on the surface of the zinc skin; removing portions of the zinc skin free from resist to uncover the underlying magnesium; then supporting the imaged plate in a substantially horizontal plane with the imaged surface of the plate facing downwardly; propelling an etchant upwardly through spray-nozzle means in high pressure, fine continuous liquid streams against the downwardly facing plate and substantially covering the working face of the same, said etchant comprising a soluble aluminum salt and an oxidizing agent having the property of etching the exposed magnesium base metal and reacting with the latter in the formation of a precipitate insoluble in the etchant which precipitate is deposited on the surface of the plate, said streams having sufficient impact against the face of the plate to prevent accumulation of precipitate on the unimaged flat surfaces of the plate while leaving the precipitate as a resist in and masking the etched pits of the half-tone work and on the etch-produced side walls delineating the non-printing portions of the plate adjacent the line work printing surfaces; continuing said etchant propelling operation after said pits are masked by said precipitate and without interruption to manually apply resist, for sufficient time to etch the non-printing areas of the line work to printing depths greater than the depth of the pits in the half-tone work and as required by the character of the line work; and finally cleaning the plate of resist remaining thereon.

3. The method of making a relief-printing printing plate of the type comprising a magnesium metal base plate having a thin zinc skin on its working face and in which the imaged printing surfaces are in relief, said method comprising the steps of forming a resist image on the surface of the zinc skin; removing portions of the zinc skin free from resist to expose the underlying magnesium; then supporting the imaged plate with the imaged surface of the plate facing spray-nozzle means; propelling an etchant through said spray-nozzle means in high pressure, fine continuous liquid streams against the face of the plate, said etchant comprising a soluble aluminum salt and an oxidizing agent having the property of etching the exposed magnesium base metal and reacting with the latter in the formation of a precipitate insoluble in the etchant which precipitate is deposited on the surface of the plate, said stream having sufficient impact against the face of the plate to prevent accumulation of the precipitate on the unimaged flat surfaces of the plate while leaving the precipitate as a resist on the etch-produced side walls of the imaged printing surfaces, said plate being supported in substantially horizontal position with its working face down and vertically over said spray-nozzle means and the etchant being forced under pressure through said spray-nozzle means in liquid streams directed upwardly against the working face of the plate and substantially covering the same, whereby etchant after impinging upon the plate falls vertically directly away from the surface of the plate; continuing said etchant propelling operation, without interruption to manually apply resist, for sufficient time to etch the plate to printing depths; and finally cleaning the plate of resist remaining thereon.

4. The method as defined in claim 3 which includes the steps of collecting the etchant propelled from said spray-nozzle means and falling off the plate being etched and recirculating said collected etchant under pressure to said spray-nozzle means.

5. The method as defined in claim 4 in which the etchant collected and recirculated to said spray-nozzle means is discarded when said printing plate is etched to printing depths and fresh etchant is used for each subsequent plate.

6. The method of making an etched relief-printing printing plate of the type comprising a magnesium metal base plate having a thin zinc skin on its working face and having printing surfaces which comprise line work deeply etched in relief, said method comprising the steps of forming a resist image on the surface of the zinc skin; removing portions of the zinc skin free from resist to expose the underlying magnesium; then supporting the imaged plate in a substantially horizontal plane with the imaged surface of the plate facing downwardly; propelling an etchant upwardly through spray-nozzle means in high pressure, fine continuous liquid streams against the downwardly facing plate and substantially covering the working face of the same, said etchant comprising a soluble aluminum salt and an oxidizing agent having the property of etching the exposed magnesium base metal and reacting with the latter in the formation of a precipitate insoluble in the etchant which precipitate is deposited on the surface of the plate, said streams having sufficient impact against the face of the plate to prevent accumulation of precipitate on the unimaged flat surfaces of the plate while leaving the precipitate as a resist on the etch-produced side walls of the imaged printing surfaces; continuing the propelling of the same etchant against the plate, without interruption to manually apply resist, for sufficient time to etch said line work to the required printing depths.

7. The method of making a relief-printing printing plate of the type comprising a magnesium metal base plate having a thin zinc skin on its working face and in which the imaged printing surfaces are in relief, said method comprising the steps of applying to the zinc coating a photographic emulsion; exposing and developing said emulsion to form a resist-image on said working face and to uncover the zinc coating forming the background area of the image; removing portions of the zinc skin free from resist to expose the underlying magnesium; then supporting the imaged plate in a substantially horizontal plane with the imaged surface of the plate facing downwardly; propelling an etchant upwardly through spray-nozzle means in high pressure, fine continuous liquid streams against the downwardly facing plate and substantially covering the working face of the same, said etchant comprising a soluble aluminum salt and an oxidizing agent having the property of etching the exposed magnesium base metal and reacting with the latter in the formation of a precipitate insoluble in the etchant which precipitate is deposited on the surface of the plate, said streams having sufficient impact against the face of the plate to prevent accumulation of precipitate on the unimaged flat surfaces of the plate while leaving the precipitate as a resist on the etch-produced side walls of the imaged printing surfaces; continuing said etchant propelling operation, without interruption to manually apply resist, for sufficient time to etch the plate to printing depths; and finally cleaning the plate of resist remaining thereon.

References Cited in the file of this patent

UNITED STATES PATENTS

| | | |
|---|---|---|
| 2,640,763 | Easley et al. | June 2, 1953 |
| 2,640,764 | Easley et al. | June 2, 1953 |
| 2,640,765 | Easley et al. | June 2, 1953 |
| 2,640,766 | Easley et al. | June 2, 1953 |
| 2,640,767 | Easley et al. | June 2, 1953 |
| 2,669,048 | Easley et al. | Feb. 16, 1954 |
| 2,701,186 | Hendrich et al. | Feb. 1, 1955 |